United States Patent

[11] 3,532,168

| [72] | Inventor | Thomas O. Webb |
| | | Tulsa, Oklahoma |
| [21] | Appl. No. | 790,434 |
| [22] | Filed | Jan. 10, 1969 |
| [45] | Patented | Oct. 6, 1970 |
| [73] | Assignee | Marathon Oil Company |
| | | Findlay, Ohio |
| | | a corporation of Ohio |

[54] CEMENTING PROCESS USING MICELLAR SOLUTIONS AS WELL PIPE AND FORMATION FACE CLEANSERS
9 Claims, No Drawings

[52] U.S. Cl.................................................. 166/292,
166/312
[51] Int. Cl...................................................... E21b 33/14,
E21b 21/00
[50] Field of Search............................................ 166/304,
285, 292, 281, 311, 312

[56] References Cited
UNITED STATES PATENTS

| 3,291,211 | 12/1966 | Savins et al................. | 166/285 |
| 3,299,952 | 1/1967 | Savins........................ | 166/285 |
| 3,299,953 | 1/1967 | Bernard....................... | 166/285 |
| 3,342,264 | 9/1967 | Willard....................... | 166/300 |
| 3,342,265 | 9/1967 | Willard et al................. | 166/300 |
| 3,348,612 | 10/1967 | Messenger.................... | 166/312X |
| 3,411,580 | 11/1968 | McKinney et al.............. | 166/312X |
| 3,467,193 | 9/1969 | Messenger.................... | 166/292 |

Primary Examiner—Stephen J. Novosad
Attorneys—Jack L. Hummel, Joseph C. Herring and Richard C. Wilson, Jr.

ABSTRACT: A micellar solution precedes the cement slurry used in casing-string cementing operations in order to (1) clean the well pipe surface of mill varnish, hydrocarbon accumulations, foreign materials, and the like; and (2) to clean the formation face of mud filter cake, occlusions, etc. so that better bonding of the pipe-to-cement and cement-to-formation can be effected.

3,532,168

CEMENTING PROCESS USING MICELLAR SOLUTIONS AS WELL PIPE AND FORMATION FACE CLEANSERS

BACKGROUND OF THE INVENTION

U.S. Pat. No. 3,342,264 to Willard, Sr. teaches a cleaning composition comprised of a micelle-forming water soluble rosin acid soap, a water soluble alkali metal silicate, a water soluble alkaline earth metal salt, lecithin, triglyceride vegetable oil, and an alkali selected from the alkali metal hydroxides, carbonates, or phosphates. The composition is said to clean the well of paraffins, asphaltic and waxy materials, silt, sand, gums, minerals, salts and hydrates.

Until now, the art has not developed a well pipe cleaner which can effectively scour the pipe clean of mill varnish and other materials and substantially clean the formation face of drilling mud residue. Further, no techniques have been advanced for the removal of such materials from the pipe surface after the casing has been introduced into the wellbore. The art has had to rely upon sand blasting and intentional rusting of the well pipe to remove mill varnish from the pipe prior to introducing the pipe into the well. These techniques are highly expensive.

A casing-string cement job depends for its success upon a pipe surface to which cement can tightly and evenly adhere. Mill varnish provides a smooth, slick surface which makes it exceedingly difficult for the cement slurry to properly take hold. Yet, the practice of cementing a well demands an effective seal on both sides of the annular space, including the annular space between the pipe and the wellbore if the cement sheath is to accomplish the objective of thoroughly isolating the oil productive horizons. This invention, by effectively removing mill varnish and other contaminants from the well pipe, assures an even seal and a successful cementing operation.

Secondly, mud filtrates and mud filter cakes agglomerate upon the formation face, thereby preventing the cement slurry from evenly adhering to that surface. A good cement-to-formation bond is produced by sweeping the formation face clean of such residue.

Mill varnish, mud filter cakes, and mud filtrates are terms well known to the art. Mill varnish is a protective coating applied to both the exterior and the interior of the well pipe at the rolling mill. Both mud filter cakes and mud filtrates generally result from pumping pressure produced on the drilling mud. Drilling mud is usually composed of clay particles and other solid materials suspended in water. The pumping pressure tends to "squeeze" the water out of the drilling mud into the formation; this aqueous medium is called the mud filtrate or mud effluent. In the case of certain drilling muds (oil base muds, emulsion base muds, etc.) the filtrate may be hydrocarbon. The mud solids which are dessicated by the pumping pressure agglutinate on the formation face and become mud filter cakes. The micellar solution of this invention cleanses the formation face of mud filtrates. Other materials such as lost circulation-restoring media may become lodged on the formation face and pipe surface and they can be removed by the micellar solutions described herein.

DESCRIPTION OF THE INVENTION

The term "micellar solution" is meant to include micellar dispersions, microemulsions, "transparent" emulsions (Blair, Jr. et al. U.S. Pat. No. 2,356,205) and micellar solution technology taught in C. G. Sumner Clayton's "The Theory of Emulsions and Their Technical Treatment," 5th ed., pp. 315-320 (1954). Examples of useful micellar solutions include those defined in U.S. Pat. Nos. 3,254,714 to Gogarty et al.; 3,275,075 to Gogarty et al.; 3,301,325 to Gogarty et al.; and 3,307,628 to Sena.

Micellar solutions are composed of hydrocarbon, aqueous medium, and surfactant. Cosurfactant(s) and electrolyte(s) can be incorporated therein. Examples of volume amounts include from about 4 to about 60 percent or more of hydrocarbon, from less than about 20 to about 90 percent aqueous medium, from at least about 4 to about 25 percent surfactant, from about 0.01 to about 20 percent cosurfactant (also identified as cosolubilizer and semipolar organic compound) and from about 0.001 to about 5 percent or more (weight percent based on aqueous medium) of electrolyte.

Examples of hydrocarbons include crude oil (both sweet and sour), partially refined fractions of crude oil, and refined fractions of crude oil. Specific examples of hydrocarbon include side cuts from crude columns, crude column overheads, gas oils, kerosene, heavy naphthas, naphthas, straight-run gasoline, liquefied petroleum gases, propane, pentane, heptane, decane, dodecane, cyclohexane, aryl compounds including benzene, naphthalene, anthracene, and alkylated aryl compounds such as alkyl phenols, etc. The hydrocarbon can be unsulfonated hydrocarbon within petroleum sulfonates, e.g. heavy vacuum gas oils.

The aqueous medium can be soft water, brackish water, or brine water.

Surfactants useful in the micellar solutions include nonionic, cationic, and anionic surfactants. Specific examples include those found in U.S. Pat. No. 3,254,714 to Gogarty et al.

Other useful surfactants include Duponol WAQE (a 30 percent sodium lauryl sulfate marketed by DuPont Chemical Corp., Wilmington, Delaware), Energetic *W–100 (a polyoxyethylene alkylphenol marketed by Armour Chemical Co., Chicago, Illinois), *Triton–X–100 (an alkylphenoxy polyethoxy ethanol marketed by Rohm & Haas, Philadelphia, Pennsylvania) and *Arquad 12–50 (a 50 percent active dodecyl trimethyl ammonium chloride marketed by Armour Chemical Co., Chicago, Illinois), Arquad 2C–75 (a 75 percent active dodecyl trimethyl ammonium chloride) and like materials.

Preferably, the surfactant is a petroleum sulfonate also known as alkyl aryl naphthenic sulfonate. The sulfonate can contain a monovalent, divalent or higher valency cation. Examples of preferred surfactants are the sodium and ammonium petroleum sulfonates having an average molecular weight within the range of from about 360 to about 520, and more preferably from about 400 to about 450. The surfactant can be a mixture of low and high molecular weight sulfonates or a mixture of two or more different surfactants.

Cosurfactants useful with the invention include alcohols, amino compounds, esters, aldehydes, ketones, and like materials containing from about 1 to about 20 or more carbon atoms. More preferably, the cosurfactant contains from about 3 to about 16 or more carbon atoms. Specific examples include alcohols such as isopropanol, n- and iso-butanol, amyl alcohols such as n-amyl alcohol, 1- and 2-hexanol, 1- and 2-octanol, decyl alcohols, dodecyl alcohols, etc., alkaryl alcohols such as p-nonylphenol and alcoholic liquors such as fusel oil. As mentioned previously, concentrations of 0.1 percent—20 percent by volume of cosurfactant are useful in the micellar solution and more preferably from about 0.1 to about 5 percent. Mixtures of two or more cosurfactants are also useful.

Electrolytes useful in the micellar solution include inorganic acids, inorganic bases, inorganic salts, organic acids, organic bases, and organic salts. Specific examples of electrolytes include sodium hydroxide, sodium chloride, sodium sulfate, hydrochloric acid, sulfuric acid, and electrolytes found in U.S. Pat. Nos. 3,330,343 to Tosch et al. and 3,297,084 to Gogarty et al.

DESCRIPTION OF THE PREFERRED EMBODIMENTS

The volume of micellar solution needed to accomplish the objectives of the invention will naturally vary with the type of well involved, i.e. a well with a large depth, one having a large sand face area, or one having a large annular space will require a greater volume of micellar solution. From 5 to 50 or more barrels of micellar solution should be sufficient for most wells. Another useful criterion is that the micellar solution should rise initially to at least 50 feet above the expected highest level of cement in the well casing.

After a time period of up to eight hours or more following injection of the micellar solution, the treated well is ready for cementing. Usually, the cement slurry can follow the micellar solution within two to four hours.

If necessary, corrosion inhibitors compatible with the particular micellar solution employed may be incorporated therein; however, in normal situations, the invention does not require their use.

The following micellar solutions are found to effectively cleanse the well pipe and the formation face. Percents are based on volume unless otherwise specified.

EXAMPLE I

| | | |
|---|---|---|
| Butene | percent | 41.8 |
| Water | do | 43.5 |
| Arquad 2C-75 | do | 14.7 |

EXAMPLE II

| | | |
|---|---|---|
| Benzene | percent | 52.5 |
| Water | do | 30.4 |
| Sodium petroleum sulfonate | do | 11.8 |
| Isobutanol | do | 5.3 |

EXAMPLE III

| | | |
|---|---|---|
| Propane | percent | 56.6 |
| Water | do | 22.6 |
| Arquad 2C-75 | do | 18.9 |
| Isopropyl alcohol | do | 1.9 |

EXAMPLE IV

| | | |
|---|---|---|
| Crude oil | percent | 48.3 |
| Water | do | 39.7 |
| Ammonium Petroleum Sulfonate | do | 9.6 |
| Primary amyl alcohol | do | 2.2 |
| Sodium chloride | do | 1.0 |

(weight percent based on water)

This invention is not to be limited by the specifics taught herein. Rather all variations and modifications obvious to those skilled in the art are intended to be included within the spirit and scope of the invention as defined in the specification and appended claims.

I claim:

1. An improved process of cementing the subsurface pipe of a well to a subterranean strata, the process comprising injecting sufficient micellar solution into the well to contact the pipe and the subterranean strata to be contacted with the cement and then injecting cement slurry to effect cementing of the subsurface pipe.

2. The process of claim 1 wherein the micellar solution remains in contact with the pipe and the subterranean strata to be cemented for a time period up to about eight hours.

3. The process of claim 1 wherein the micellar solution is comprised of from about 4 to about 60 percent hydrocarbon, from about 20 to about 90 percent aqueous medium, and from about 4 to about 25 percent sulfonate.

4. The process of claim 3 wherein the surfactant is an ammonium petroleum sulfonate having an average molecular weight within the range of from about 360 to about 520.

5. The process of claim 3 wherein the surfactant is a sodium petroleum sulfonate having an average molecular weight of from 400 to about 450.

6. The process of claim 3 wherein the micellar solution contains a cosurfactant and/or electrolyte.

7. An improved process of cementing the subsurface pipe of a well to a subterranean strata, the process comprising injecting sufficient micellar solution into the well to cleanse the pipe of mill varnish, hydrocarbon accumulations and other foreign materials and the subterranean strata to be contacted with cement of drilling mud residue and occlusions, and then injecting the cement slurry to effect cementing of the subsurface pipe.

8. The process of claim 7 wherein the micellar solution remains in contact with the pipe and the subterranean strata to be contacted with cement for a time period up to about eight hours.

9. The process of claim 7 wherein from about 5 to about 50 barrels of the micellar solution are injected into the well.